(12) United States Patent
Attie

(10) Patent No.: US 6,931,985 B1
(45) Date of Patent: Aug. 23, 2005

(54) COOKING VESSEL

(76) Inventor: Nobile Attie, 244 Linderman Ave., Kingston, NY (US) 12401

( * ) Notice: Subject to any disclaimer, the term of this patent is extended or adjusted under 35 U.S.C. 154(b) by 0 days.

(21) Appl. No.: 10/640,101

(22) Filed: Aug. 13, 2003

Related U.S. Application Data

(60) Provisional application No. 60/484,377, filed on Jul. 2, 2003.

(51) Int. Cl.[7] ................................................ A23L 1/00
(52) U.S. Cl. ............................ 99/340; 99/357; 99/419; 99/400; 99/444; 99/446; 99/451
(58) Field of Search .................. 99/339, 340, 345–347, 99/386, 400, 401, 451, 443 R, 443 C, 426, 427, 444–450, 481, 483; 126/41 R, 9 R, 25 R, 40, 30; 219/388, 400, 401

(56) References Cited

U.S. PATENT DOCUMENTS

| | | | |
|---|---|---|---|
| 1,889,218 A | | 11/1932 | Reedy |
| 2,456,988 A | | 12/1948 | Pierson |
| 2,856,669 A | | 10/1958 | Kalan |
| 2,885,950 A | * | 5/1959 | Stoll et al. ..................... 99/340 |
| 2,956,497 A | * | 10/1960 | Bernstein .................. 99/421 H |
| 3,159,094 A | * | 12/1964 | Crease et al. ................. 99/340 |
| 3,176,118 A | * | 3/1965 | Scott .......................... 219/394 |
| 3,267,924 A | | 8/1966 | Payne |
| 3,450,025 A | * | 6/1969 | Fleming ....................... 99/399 |
| 4,304,177 A | * | 12/1981 | Loeffler et al. ............... 99/333 |
| 5,184,540 A | * | 2/1993 | Riccio ....................... 99/421 H |
| 5,315,922 A | | 5/1994 | Keller |
| 5,445,066 A | | 8/1995 | Rosset |
| 5,536,518 A | | 7/1996 | Rummel |
| 5,603,255 A | | 2/1997 | Nouveot et al. |
| 5,603,256 A | * | 2/1997 | Charlson et al. .............. 99/445 |
| 5,605,092 A | | 2/1997 | Riccio |
| 5,907,994 A | * | 6/1999 | Dotan ......................... 99/332 |
| 6,260,478 B1 | | 7/2001 | Harneit |
| 6,263,783 B1 | | 7/2001 | Lui |
| 6,343,545 B1 | | 2/2002 | Patterson et al. |
| 6,422,134 B1 | * | 7/2002 | Barksdale et al. ............ 99/340 |
| 6,425,318 B1 | * | 7/2002 | Kim ............................ 99/327 |
| 6,626,089 B1 | * | 9/2003 | Hubert ........................ 99/339 |
| 6,658,993 B2 | * | 12/2003 | Kuenen ....................... 99/446 |

* cited by examiner

Primary Examiner—Timothy F. Simone
(74) Attorney, Agent, or Firm—Design IP

(57) ABSTRACT

A cooking vessel that combines the functions of a grill and an oven. The vessel includes a cooking chamber having an upwardly arched ceiling comprised of fire brick. A cooking surface is located within the cooking chamber. A pull-out mechanism is attached to the cooking surface and is adapted to move the cooking surface in and out of the cooking chamber through a front opening. The front opening defines a baffle, which traps heat in the cooking chamber. Two infrared gas burners, located below and outboard from the cooking surface, heat food located on the cooking surface directly. Radiant heat from the ceiling indirectly heats the food.

26 Claims, 5 Drawing Sheets

COOKING VESSEL

CROSS-REFERENCE TO RELATED APPLICATION

This application claims the benefit of U.S. Provisional Patent Application No. 60/484,377, filed Jul. 2, 2003, which is incorporated herein by reference in its entirety.

BACKGROUND OF THE INVENTION

The present invention relates to a vessel for cooking food.

In commercial cooking, such as in a restaurant, a wide variety of foods must be cooked quickly and efficiently. Ovens and grills are two widely-used types of cooking vessels. Ovens are designed to cook food at relatively low temperatures, through primarily indirect heating (i.e., the food is cooked by heating the entire cooking chamber to the desired temperature). A grill is designed to cook food at higher temperatures. A grill also cooks food using primarily direct heating, typically from a flame or other heat source located directly below the food. If the grill includes an enclosure over the food, some indirect heating also takes place. In order to cook food evenly, conventional grills require food to be turned over during the cooking process.

The present invention combines the functions of both a grill and an oven. In addition, the invention includes many improvements over both grill and oven designs of the prior art.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
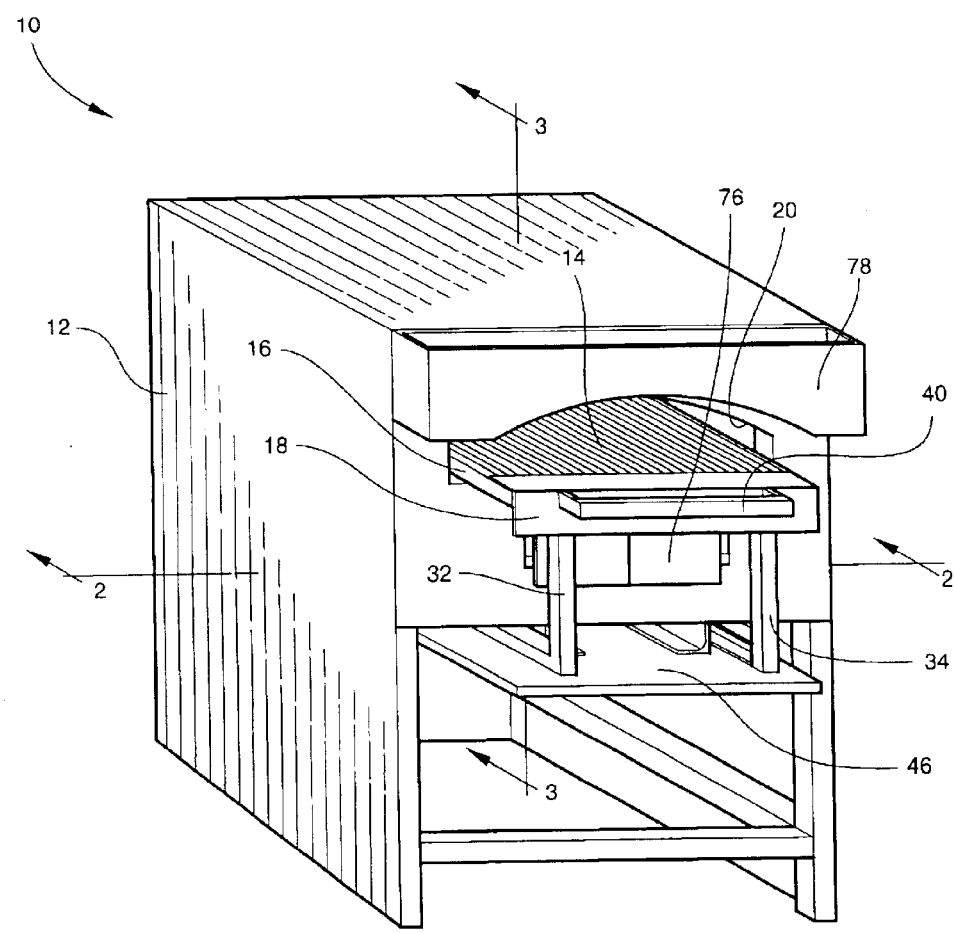
FIG. 1 is a perspective view of the cooking vessel of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms used in the specification and claims to describe portions of the cooking vessel 10 of the present invention (e.g., top bottom, left, right, etc.) reflect the orientation of the cooking vessel 10 in the drawing figures. These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

FIG. 1 shows a preferred embodiment of the cooking vessel 10 of the present invention, which includes a cooking surface 16 designed to be contained within a cooking chamber 14. As is conventional with most cooking vessels, an enclosure 12 is preferably provided, which surrounds the cooking chamber 14 and enables the chamber 14 to be located at a convenient height from the floor. Any durable, rigid material is suitable for the enclosure 12, such as 11 gage steel, for example.

Figure 2:
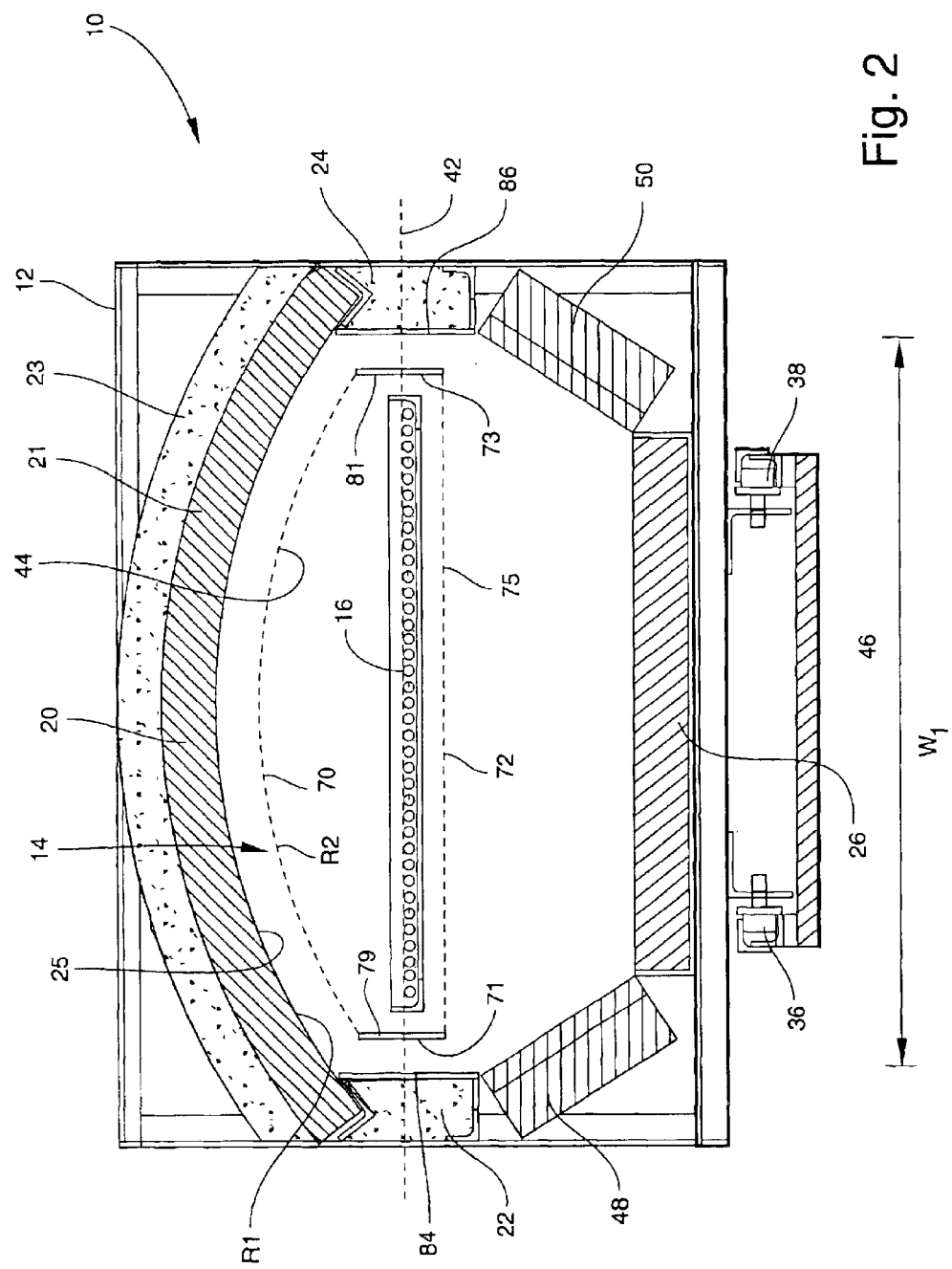
FIG. 2 is a sectional view taken along line 2—2 of FIG. 1.

Turning to FIG. 2, the interior of the cooking vessel 10 is shown in greater detail. The cooking chamber 14 is defined by an upwardly arched ceiling 20, a left side wall 22, a right side wall 24, a bottom wall 26, a rear wall 28 and a front wall 30 (see FIG. 3). A front opening 44 is provided in the front wall 30. Two infrared gas burners 48, 50 are located in the lower left and right corners, respectively, of the cooking chamber 14. The cooking surface 16 is preferably centrally located within the cooking chamber 14 and defines a cooking plane 42.

In this embodiment, the cooking surface 16 is shown as a grill (i.e., a surface having members which are spaced apart). The cooking surface 16 is preferably located slightly closer to the ceiling 20 than the bottom wall 26 and within the tense radiant range of the burners 48, 50.

Other types of cooking surfaces are, of course, possible. For example, a hearth (i.e., a sold cooking surface) or a rotisserie could be substituted for the grill. Alternatively, the cooking surface 16 could be a combination of grill and hearth surfaces. A hearth could be accommodated using the same front opening 44 as a grill.

Figure 5:
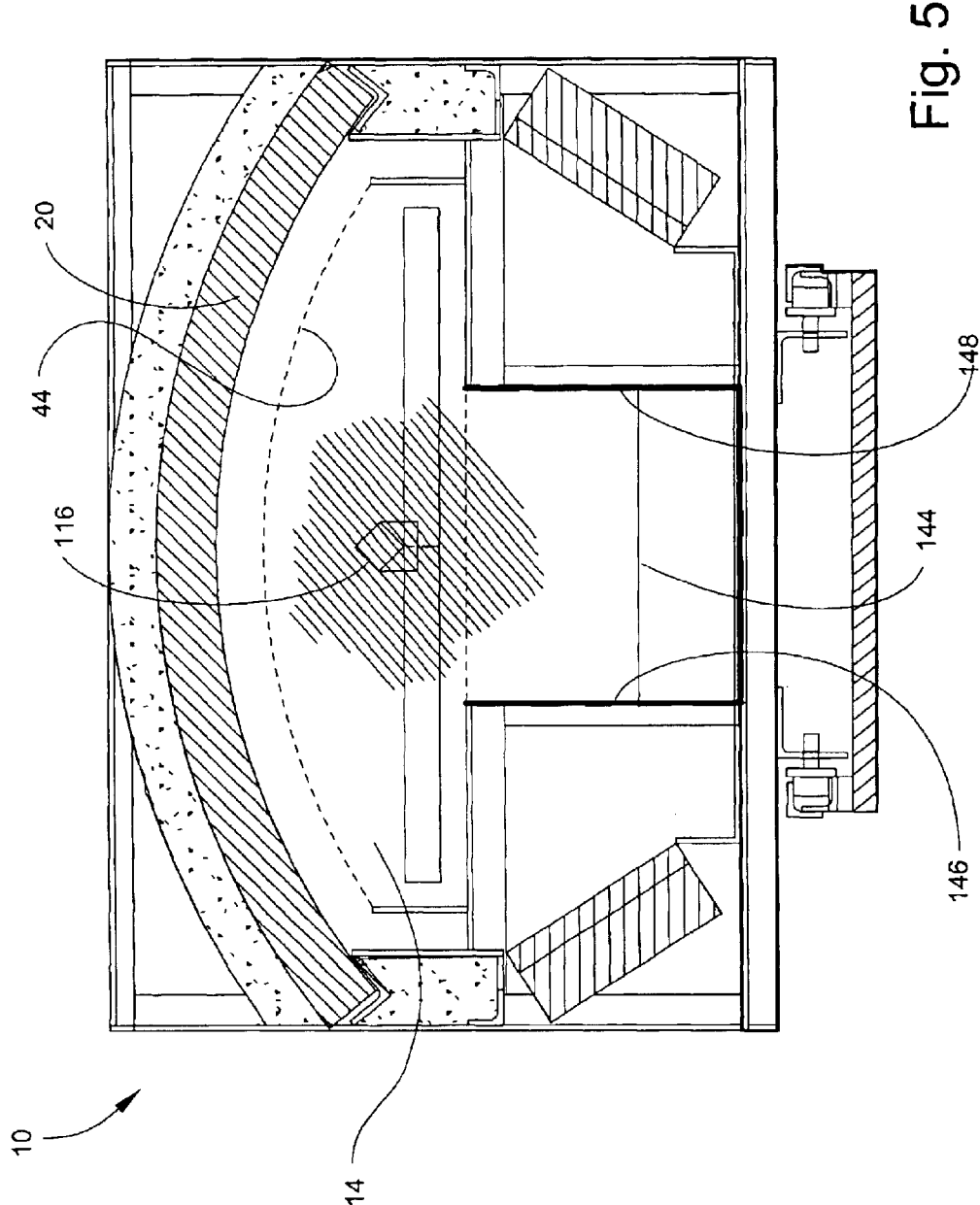
FIG. 5 is a sectional view taken along line 2—2, showing an alternate embodiment, designed to accommodate a rotisserie.

FIG. 5 shows the cooking vessel 10, modified to accommodate a rotisserie 116. A lower portion 144 of the front opening 44 is included, which extends downwardly from the front opening 44 shown in FIG. 2. The location of the left and right sides of the second front opening are indicated by reference numerals 146 and 148, respectively. With this modification, the service doors 76 (shown in FIG. 1) would preferably swing open to enable easy insertion and removal of the rotisserie 116 and close to prevent additional heat loss from the cooking chamber 14. The rotisserie 116 could use the same type of pull-out mechanism used with the cooking surface 16, which is described in detail below.

The cooking surface 16 could also include a plurality of removable sections so that it can be replaced with either grill or hearth sections. This allows for maximum flexibility in commercial food establishments (e.g., restaurants), where large quantities of diverse foods must be cooked in a short period of time. Alternatively, the cooking surface 16 could be fixed, rather than slidable or removable.

Referring to FIGS. 1 and 2, the cooking vessel 10 preferably provides for easy insertion and removal of the cooking surface 16 from the cooking chamber 14 through the front opening 44, in order to allow for easy placement and removal of food. In this embodiment, a pull-out mechanism 18 is provided. The pull-out mechanism 18 includes a pair of L-shaped support arms 32, 34 which are each affixed to the cooking surface 16 and a pair of rollers 36, 38, respectively. The rollers 36, 38 allow the lower portions of the support arms 32, 34 to slide horizontally (parallel to the cooking plane 42), which enables the cooking surface 16 to be inserted (closed position) and removed (open position, see FIG. 3) from the cooking chamber 14. The rollers 36, 38 and the lower portions of the support arms 32, 34 are preferably located outside the cooking chamber 14 so that it is not necessary for these components to withstand the intense heat inside the chamber 16. In this embodiment, the rollers 36, 38 are located below the bottom wall 26. Alternatively, the rollers 36, 38 could also be located on the sides of the vessel 10, at or near the vertical position of the cooking surface 16. Other structures, such as ball-bearing slides, for example, could be substituted for the rollers 36, 38. The term "slider," as used in the specification and claims, is intended to refer to all such structures, including rollers.

A handle 40 is preferably provided to facilitate movement of the pull-out mechanism 18. Optionally, latches or detents (not shown) may be provided to prevent unintended movement of the cooking surface 16. Additional support for the cooking surface 16 (e.g., slides, grooves, guides, etc.) may be included inside the cooking chamber 14 to allow the cooking surface 16 to support larger amounts of food and/or to minimize deflection of the cooking surface 16 when loaded.

The pull-out mechanism 18 also preferably includes a drip pan 46 oriented horizontally and affixed to the lower legs of the support arms. The drip pan 46 is positioned to catch any drippings from the cooking surface 16 when the cooking surface 16 in an open position.

Referring now to FIG. 2, the left and right burners 48, 50 will be described in greater detail. For convenience in describing the relative positions of the burners 48, 50, a vertical axis 52 will be defined. The vertical axis 52 bisects the cooking surface 16 from left to right. The left burner 48 is offset to the left of the vertical axis 52 and the right burner 50 is offset to the right of the vertical axis 52. In the interest of brevity, the positioning and orientation of only the left burner 48 will be described in detail. It is understood that the positioning and orientation of the right burner 50 is a mirror image.

Figure 4:
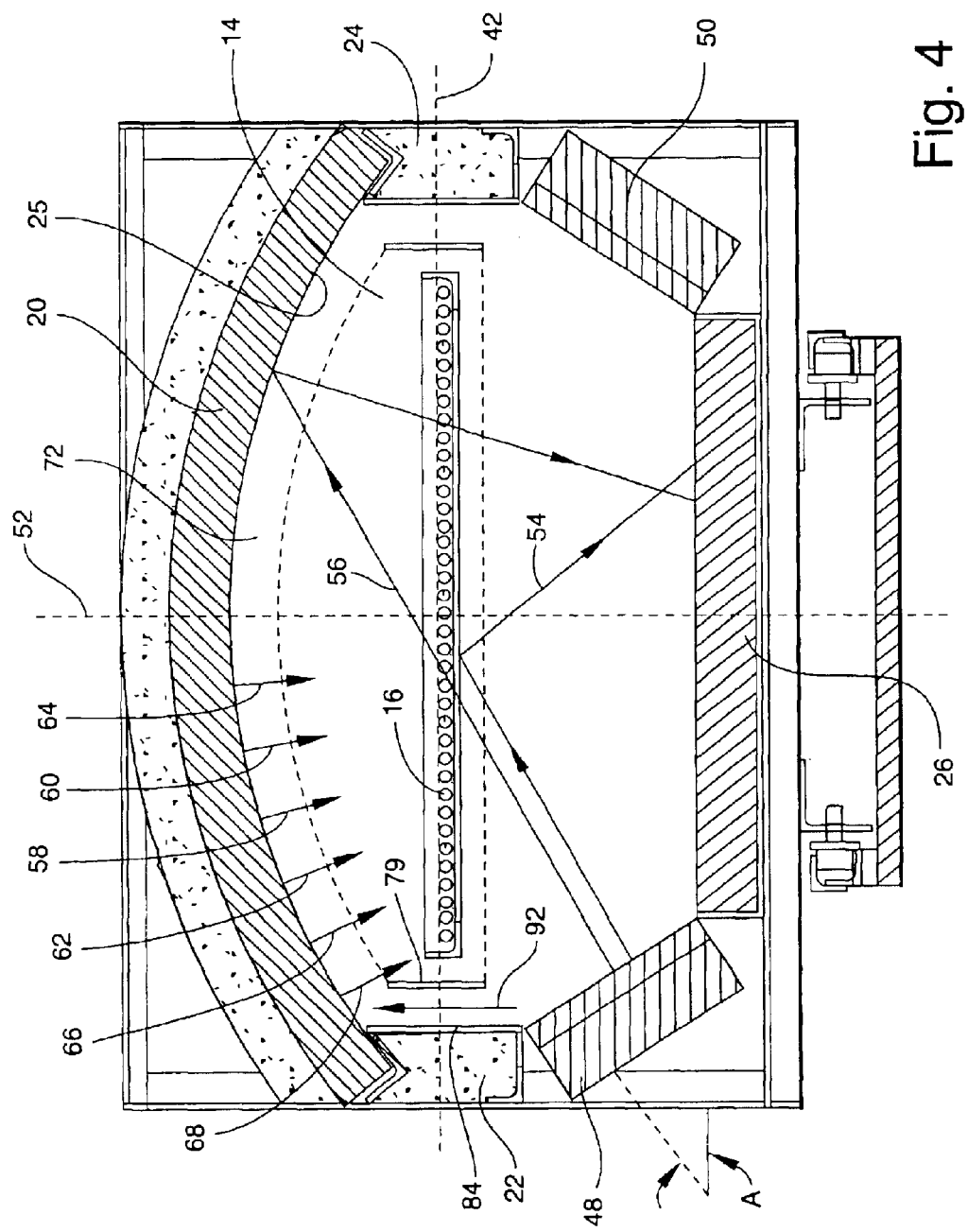
FIG. 4 is a sectional view taken along line 2—2, showing how heat is distributed throughout the cooking chamber.

Referring now to FIG. 4, the left burner is angled upwardly, so that heat emitted from the burner 48 and directed toward the cooking surface 16. In this embodiment, the angle of incline A is 33 degrees. The cooking vessel 10 will still work reasonably well with moderate variation of the angle of incline A (e.g., 25–40 degrees, and preferably 30–35 degrees). The optimal angle of incline A may be different for other embodiments of the cooking vessel 10 having differently dimensioned cooking chambers 14. In addition, different types of burners may require different angles of incline.

The burner 48 is preferably positioned well to the left of the vertical axis 52. In this embodiment, the burner 48 is positioned almost directly below the left side wall 22, in the lower left corner of the cooking chamber 14.

The burner 48 directly heats of the cooking surface 16 and food (not shown), as well as the ceiling 20. A first heating path for direct heating of the cooking surface 16 is identified by reference numeral 54, which shows heat being directed to the cooking surface 16. As can be seen in FIG. 4, the first heating path 54 intersects the cooking plane 42 at a non-orthogonal angle. Some of the heat from the first heating path 54 will be absorbed by the cooking surface 16 and food and some of the heat is reflected towards the bottom wall 26. A second heating path for direct heating of the ceiling 20 is identified by reference numeral 56. Some of the heat from the second heating path 56 is absorbed by the ceiling 20 and some is reflected toward the bottom wall 26. In order to promote even heating and heat circulation, the second heating path 56 preferably intersects the ceiling to the right of the vertical axis 52.

The relative proportions of heat emitted from the burner 48 that follow the first heating path vs. heat that follows the second heating path depends, in part upon the type of cooking surface used (i.e., a grill having widely-spaced members will allow much more heat to pass through to the ceiling 20 than a hearth), as well as the amount of food placed on the cooking surface 16.

Other types of burners, such as gas burners or electric coil burners, could be substituted for the infrared gas burners 48, 50. Infrared gas burners are preferred because of more even heating characteristics, faster heating and the ability to more efficiently heat surfaces from a distance. If gas burners (either standard or infrared) are used a gas inlet port (not shown) will obviously be required. In addition, the burners 48, 50 are preferably have digital controls (not shown) to provide precise heat control.

Figure 3:
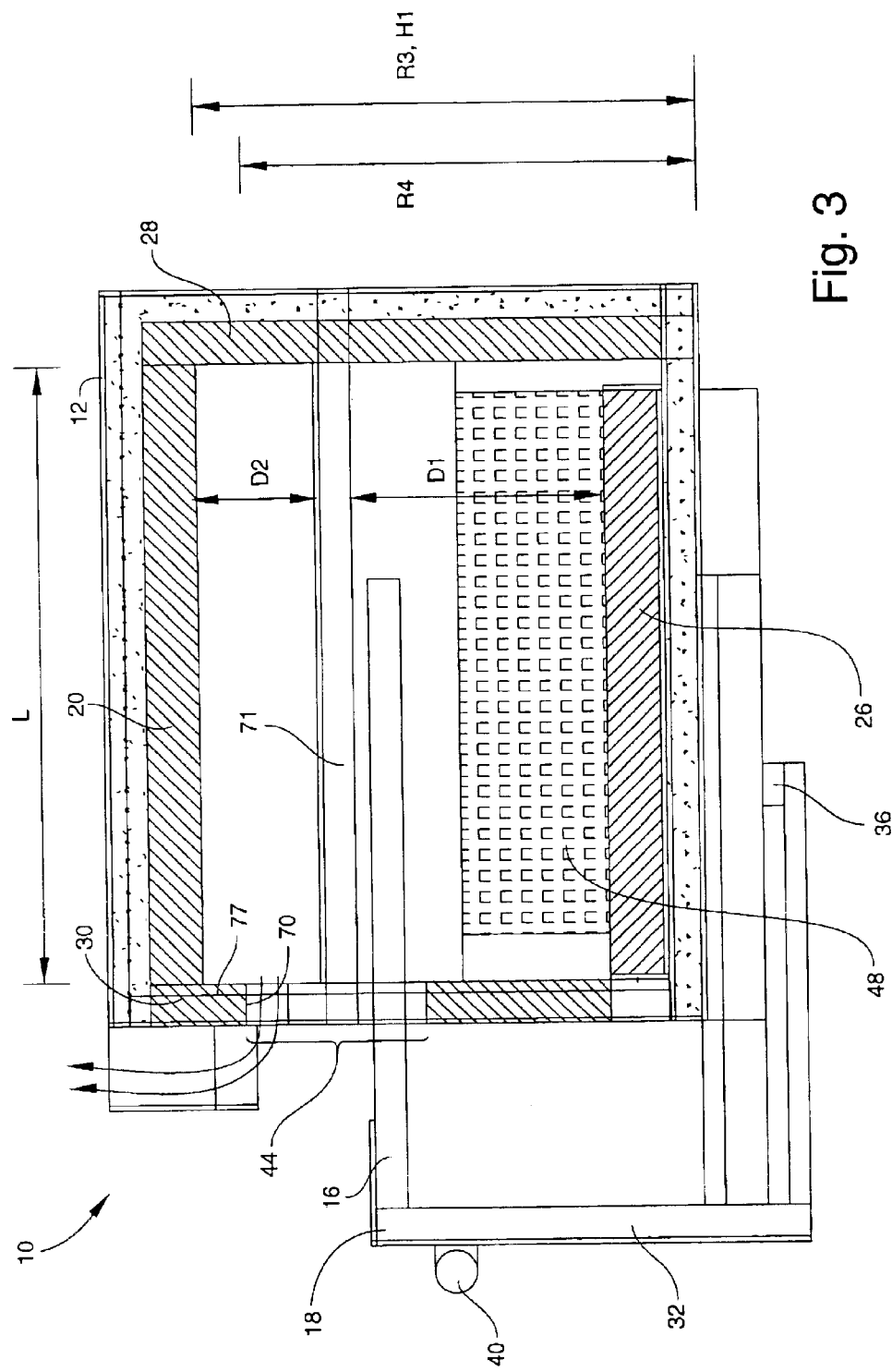
FIG. 3 is a sectional view taken along line 3—3 of FIG. 1.

The ceiling 20 is preferably formed of a layer of high temperature fire brick 21 positioned inside an insulating layer 23 and includes an inner surface 25 which is preferably arcuate in lateral cross-section (see FIG. 2) and linear in longitudinal cross-section (see FIG. 3). In order to provide sufficient insulation and radiant heating, the insulating layer 23 is preferably at least 1.5 inches thick and the high temperature fire brick 21 is preferably 3–4 inches thick. Any suitable high-temperature insulation can be used, such as 8 pound per cubic foot density ceramic fiber insulation, for example.

The fire brick used in the ceiling 20 is preferably a clayed fire brick comprising at least 50% clay content, 10–15% silica & aluminum content. The remaining content is preferably bonding material.

When the cooking vessel 10 has been pre-heated, the fire brick 21 radiates heat as shown by the lines identified by reference numbers 58, 60, 62, 64, 66, 68. Such radiation heats food on the cooking surface 16 from the top. The upwardly arched shape of the inner surface 25 of the ceiling 20 promotes even heating of food. In this embodiment, the radius of curvature R1 of the inner surface 25 of the ceiling 20 is 30.1 inches. Of course, the cooking vessel 10 will still function reasonably well with minor to moderate variations of the radius of curvature R1 of the inner surface 25 of the ceiling 20 (e.g., 25–35 inches). In addition, the optimal radius of curvature R1 may be different for other embodiments of the cooking vessel 10 having differently dimensioned cooking chambers 14.

The front opening 44 performs two functions: (1) it provides an area for inserting and removing the cooking surface 16 from the cooking chamber 14; and (2) it provides a way for heat to vent from the cooking chamber 14. The venting structure of the present invention eliminates the need for a hood or vertical venting system to be attached to the cooking vessel 10 and allows for higher cooking temperatures and more efficient cooking than a conventional grill having an open top.

The front opening 44 includes a perimeter 72 having an arched top edge 70 and generally linear left and right edges 71, 73 and bottom edge 75. In order to clearly illustrate the shape and location of the perimeter 73 of the front opening 44, it is shown in dashed lines in FIG. 2 even though it does not actually appear in the view shown in FIG. 2.

The arched top edge 70 is preferably has a radius of curvature R2 about two inches smaller than the radius of curvature R1 of the inner surface 25. In addition, the rise R4 of the top edge 70 preferably falls below the rise R3 of the inner surface 25. This difference in radii of curvature and rise creates a baffle 72 that traps heat along the inner surface 25 of the ceiling 20. As with the radii of curvature R1, R2 of the inner surface 25 and the top edge 70, the optimal difference between rises R3, R4 may be different for other embodiments of the cooking vessel 10 having differently dimensioned cooking chambers 14. It has been found that a difference of about two inches is suitable.

A baffle of about two inches is also preferably provided between the left and right side edges 71, 73 of the front opening 44 and the left and right side walls 22,24, respectively, of the cooking chamber 14. In addition, two inner steel plates 71, 73 are preferably provided. The inner steel plates 71, 73 extend from the left and right edges 71, 73, respectively to the rear of the cooking chamber 14. Corresponding outer steel plates 84, 86, affixed to the left and right side walls 22, 24, respectively, are also preferably provided. The inner steel plates 71, 73 can be removable for cleaning and alternate cooking surface 16 configurations. Any convenient means could be used for such removal, such as slender trays (not shown) upon which each inner steel plate 71, 73 could slide.

As shown in FIG. 4, the left inner steel plate 71 and left outer steel plate 84 channel heat (see line 92) from the left burner 48 upwardly, which prevents cooking temperatures along the outer edges of the cooking surface 16 from being substantially higher than in the center of the cooking surface 16. The right inner plate 73 and right outer plate 86 operate identically to the left inner steel plate 71 and left outer steel plate 84.

A guard 78 is preferably provided on the front of the enclosure 12 above the front opening 44 to channel the vented heat up and away from the operator of the cooking vessel 10.

Location of the left, right and bottom edges 71, 73, 75 of the front opening 44 is less important than that of the top edge 70, so long as the left, right and bottom edges 71, 73, 75 provide sufficient clearance for the cooking surface 16 to be inserted and removed.

The bottom wall 26 preferably includes an absorbent material, such as sand, lava rock, water, etc., to catch drippings from food as it cooks on the cooking surface 16, thereby reducing flare-ups. Use of water as an absorbent material is preferred due to ease of clean-up If water is used, the bottom wall would preferably include a water-tight tray and a conventional float system to add water during cooking as it evaporates.

The cooking vessel 10 also preferably includes a service door 76, which enables access to the portion of the cooking chamber 14 below the cooking surface 16 to clean out food drippings and other debris that falls below the cooking surface 16.

Many other embodiments of the cooking vessel 10 are possible. For example, multiple cooking chambers could be provided. In such an embodiment, an upper cooking chamber could have a fixed hearth (but be otherwise similar in configuration to the single cooking chamber 14) and the lower chamber could include a sliding grill (as in the first embodiment).

The embodiments of the invention described herein are likely to be used in a commercial setting, such as a restaurant, for example. However, the invention could also be used beneficially in residential applications.

While the principles of the invention have been described above in connection with preferred embodiments, it is to be clearly understood that this description is made only by way of example and not as a limitation of the scope of the invention.

What is claimed is:

1. A cooking vessel comprising:
    a cooking chamber defined by an upwardly arched ceiling having an inner surface, a left side wall, a right side wall, a front wall, a rear wall and a bottom wall, the ceiling being located above the left side wall, right side wall and rear wall;
    a cooking surface located within the cooking chamber, the cooking surface defining a cooking plane and being bisected from left to right by a first vertical axis;
    a first heat source located below the cooking surface and offset to the left of the first vertical axis, the first heat source being adapted to emit heat along a first direct heating path, the first direct heating path intersecting the cooking plane at a first angle, the first angle being non-orthogonal; and
    a second heat source located below the cooking surface and to the right of the first vertical axis, the second heat source being adapted to emit heat along a second direct heating path, the second direct heating path intersecting the cooking plane at a second angle, the second angle being non-orthogonal.

2. The cooking vessel of claim 1, wherein the front wall includes a first opening having a top edge and a first baffle located between the ceiling and the top edge of the first opening, the first baffle having a width defined as the distance from the inner surface of the ceiling to the top edge of the first opening.

3. The cooking vessel of claim 2, wherein the width of the first baffle is at least 1.0 inches.

4. The cooking vessel of claim 2, wherein the first opening includes right and right side edges, a second baffle is located between the left side edge of the first opening and the left side wall of the cooking chamber and a third baffle is located between the right side edge of the first opening and the right side wall of the cooking chamber, the second baffle having a width defined as the distance from the left side edge to the left side wall and the third baffle having a width defined as the distance from the right side edge to the right side wall.

5. The cooking vessel of claim 4, wherein the width of each of the second and third baffles is at least 1.0 inches.

6. The cooking vessel of claim 2, wherein the top edge of the first opening is upwardly arched.

7. The cooking vessel of claim 6, wherein the ceiling includes a first rise and the top edge of the first opening includes a second rise that is less than the first rise.

8. The cooking vessel of claim 2, wherein the first opening provides the only exhaust outlet for the cooking chamber.

9. The cooking vessel of claim 1, wherein the cooking surface is attached to a pull-out mechanism adapted to move the cooking surface in and out of the cooking chamber through the first opening.

10. The cooking vessel of claim 9, wherein the pull-out mechanism comprises at least one horizontal slider and a handle attached to a face member, the cooking surface is rigidly connected to the face member and the face member is connected to the at least one horizontal slider.

11. The cooking vessel of claim 10, wherein the at least one horizontal slider is located below the bottom wall.

12. The cooking vessel of claim 10, wherein the pull-out mechanism further comprises a drip pan located below the cooking surface that moves with the cooking surface when the cooking surface is moved in and out of the cooking chamber.

13. The cooking vessel of claim 1, wherein the cooking surface comprises a grill.

14. The cooking vessel of claim 13, wherein at least a portion of the cooking surface comprises a hearth.

15. The cooking vessel of claim 14, wherein the at least a portion of the cooking surface comprises a hearth is permanently mounted within the cooking chamber.

16. The cooking vessel of claim 13, wherein the cooking surface comprises a rotisserie.

17. The cooking vessel of claim 16, wherein the front wall includes a first opening, the first opening having a lower portion than can be opened, to allow insertion and removal of the rotisserie from the cooking chamber, and closed, to reduce heat loss through the lower portion of the first opening.

18. The cooking vessel of claim 1, wherein heat emitted along the first direct heat path intersects the celling to the right of the first vertical axis and heat emitted along the second direct heat path intersects the ceiling to the left of the first vertical axis.

19. The cooking vessel of claim 18, wherein the first and second angles are each between 25 and 40 degrees.

20. The cooking vessel of claim 19, wherein the first and second angles are each between 30 and 35 degrees.

21. The cooking vessel of claim 1, wherein the first and second heat sources are both infrared gas burners.

22. The cooking vessel of claim 1, wherein the ceiling comprises fire brick.

23. The cooking vessel of claim 22, wherein the fire brick comprises a clayed fire brick.

24. The cooking vessel of claim 23, wherein the fire brick comprises at least 50% clay.

25. The cooking vessel of claim 22, wherein the ceiling comprises fire brick layered inside a ceramic insulation layer.

26. A cooking vessel comprising:

a cooking chamber defined by an upwardly arched ceiling having an inner surface, a left side wall, a right side wall, a front wall, a rear wall and a bottom wall, the ceiling being located above the left side wall, right side wall and rear wall;

a cooking surface located within the cooking chamber, the cooking surface defining a cooking plane and being bisected from left to right by a first vertical axis;

a pull-out mechanism attached to the cooking surface, the pull-out mechanism being adapted to move the cooking surface in and out of the cooking chamber through the first opening;

a first heat source located below the cooking surface and offset to the left of the first vertical axis, the first heat source being adapted to emit heat along a first direct heating path, the first direct heating path intersecting the cooking plane at a first angle, the first angle being non-orthogonal; and a second heat source located below the cooking surface and to the right of the first vertical axis, the second heat source being adapted to emit heat along a second direct heating path, the second direct heating path intersecting the cooking plane at a second angle, the second angle being non-orthogonal.

* * * * *